March 17, 1959  B. G. PRICE ET AL  2,878,446
METHODS AND APPARATUS FOR INSPECTING FERROMAGNETIC MEMBERS
Filed April 3, 1957  4 Sheets-Sheet 2

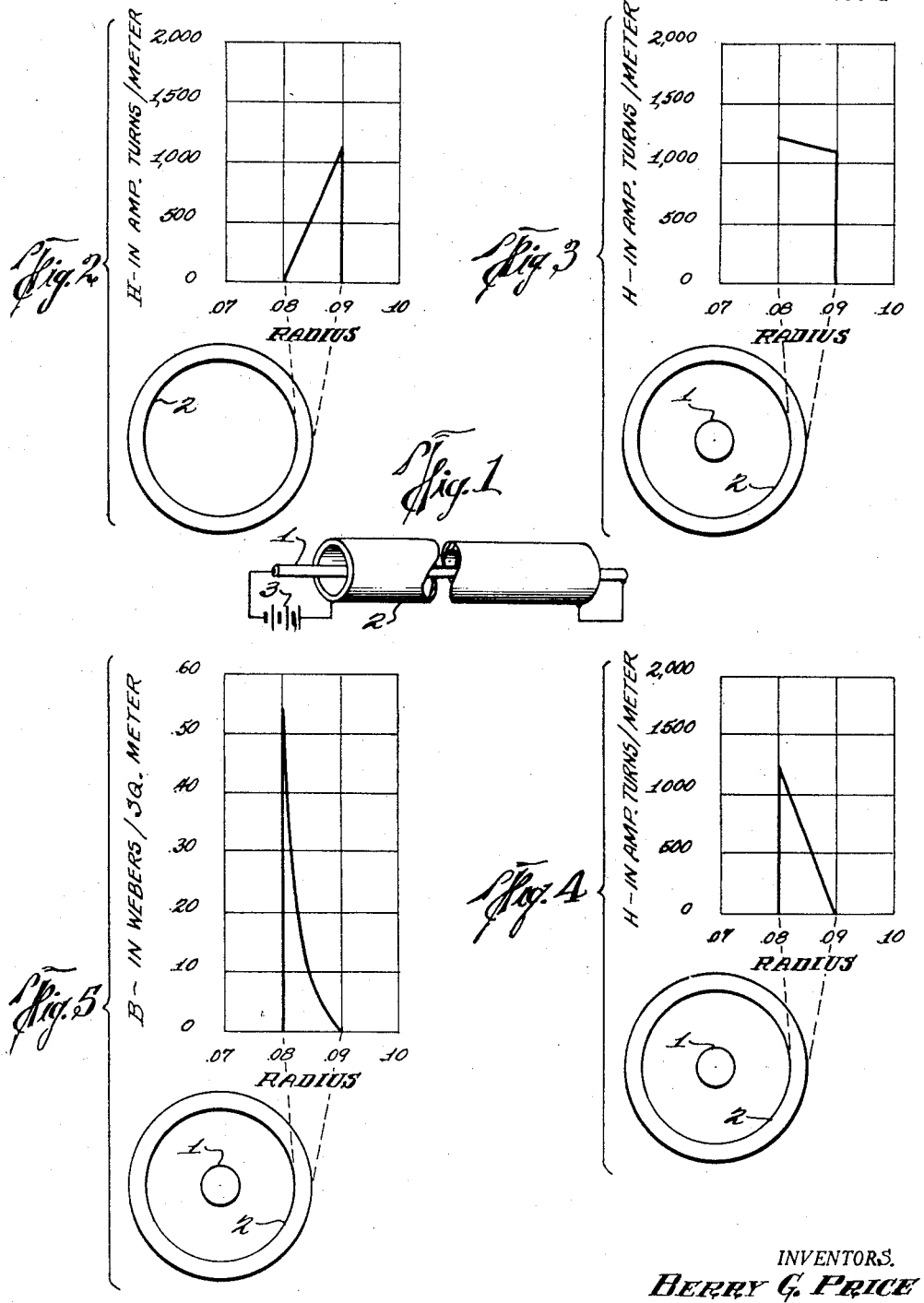

INVENTORS.
BERRY G. PRICE
JULIAN F. UNGER
FENTON M. WOOD
By Thomas O. Arnold
Melvin R. Stidham
ATTORNEY March 17, 1959 B. G. PRICE ET AL 2,878,446
METHODS AND APPARATUS FOR INSPECTING FERROMAGNETIC MEMBERS
Filed April 3, 1957 4 Sheets-Sheet 3
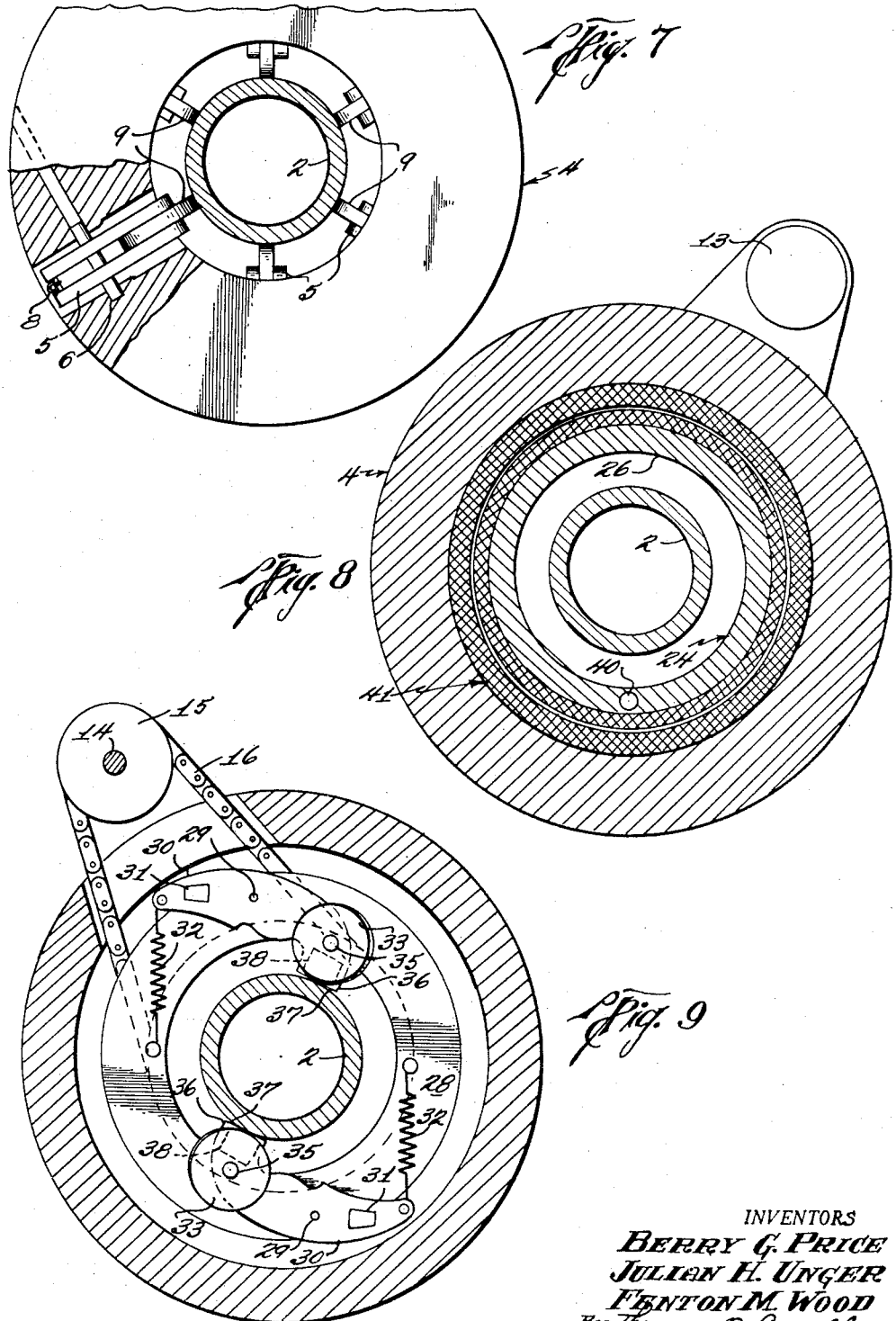
INVENTORS
BERRY G. PRICE
JULIAN H. UNGER
FENTON M. WOOD
By Thomas O. Arnold
Melvin R. Stidham
ATTORNEYS

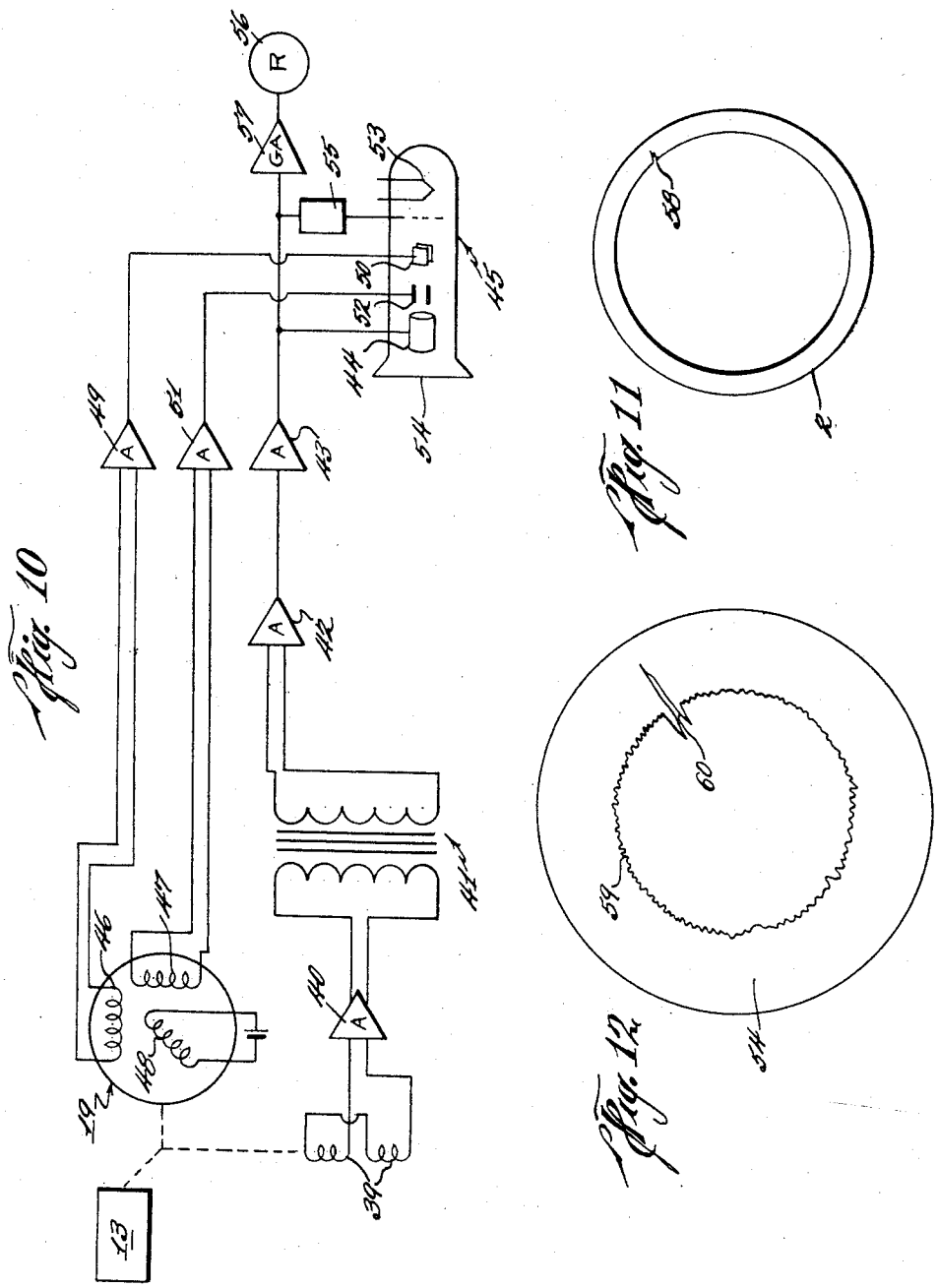

United States Patent Office 2,878,446
Patented Mar. 17, 1959

2,878,446

METHODS AND APPARATUS FOR INSPECTING FERROMAGNETIC MEMBERS

Berry G. Price, Julian H. Unger, and Fenton M. Wood, Houston, Tex., assignors to Tuboscope Company, Harris County, Tex., a corporation of Delaware Application April 3, 1957, Serial No. 650,418

8 Claims. (Cl. 324—37)

This invention relates to magnetic testing and particularly to an improved method and apparatus for the magnetic detection, location and measurement of flaws or defects in tubular ferromagnetic members such as pipe, well casing and the like.

In the inspection of such tubular goods, it is important not only to detect flaws or defects, such as seams, laps, quench cracks, pits, slugs, etc., but also to measure such flaws with a relatively high degree of accuracy. Thus, The American Petroleum Institute Standard, section 5a, paragraph 40, pertaining to customer acceptability of oil field pipe, provides that the depth of a defect in oil field tubular goods in excess of 12½% of the tabulated wall thickness of the tubular goods shall be deemed excessive and the goods therefore considered as unacceptable. Of the many discontinuities ordinarily existing in such tubular ferromagnetic goods, only a very small percentage penetrate the wall of the goods to a depth in excess of 12½%. Thus, methods and apparatus which merely detect, but cannot accurately measure, such flaws are not satisfactory for determining acceptability of the goods.

The usual method for inspecting tubular ferromagnetic goods involves the establishment of a magnetic field which is circumferential with respect to the tubular goods and which is distorted by any flaws which may exist in the goods, the distortion being detected by scanning the tubular goods with a detector coil, a signal being induced in the detector coil by the distortion of the magnetic field. Various ways for establishing the circumferential field and for carrying out the scanning operation have been proposed.

In accordance with one prior method, the circumferential magnetic field is induced by passing an electrical current down the wall of the tubular member being inspected. The resulting magnetic field is characterized by existence of maximum flux density on the outside surface of the tubular member being tested and minimum flux density at the inner surface, the flux density at both surfaces being significant. Such a method presents two marked disadvantages. First, though the flux density of the circumferential field is significant at the inner surface of the member being inspected, its magnitude is so small as to make detection of inwardly disposed flaws very difficult. Second, the outer surface of the tubular goods, where the flux density is maximum, usually carries a substantial amount of mill scale resulting from heat treatment of the pipe, the mill scale usually being in the form of $Fe_3O_4$ and, in any event, having different magnetic characteristics than the body of the goods. The mill scale creates numerous and varied magnetic flux discontinuities at the outer surface of the tubular goods and these discontinuities cause noise signals in the detector system which tend to mask the flaw-promoted signals. The problem arising from mill scale is particularly serious in the testing of oil field pipe, and is further magnified when alternating current is employed to establish the magnetic field. A similar difficulty arises when the outer surface of the tubular goods is relatively rough.

Prior-art workers have obtained some improvement in this type of magnetic testing by passing the magnetizing current through a conductor, usually an aluminum or copper bar, disposed longitudinally within the tubular member being tested. In that event, the resulting circumferential magnetic field has a greater flux density at the inner surface of the goods than at the outer surface, so that noise signals resulting from mill scale or other discontinuities at the outer surface of the goods are somewhat reduced. However, even with this method of magnetization, the magnitude of the noise signals resulting from outer surface discontinuities is so great as to cause a very objectionable problem.

An object of the present invention is to provide a method and apparatus for magnetic inspection of ferromagnetic tubular goods which will not only detect flaws or defects in the goods but will also accurately measure the size of the flaws or defects and indicate the radial position thereof in the tubular goods.

Another object is to devise such a method and apparatus capable of detecting and accurately measuring flaws or defects on the inside as well as the outside surface of the tubular member being tested.

A further object of the invention is to provide a method and apparatus for magnetic inspection of ferromagnetic tubular goods capable of providing a clear indication of any substantial flaw or defect in the goods with such indication appearing as a substantially linear function of the physical dimensions of the flaw or defect.

Yet another object is to provide such a method and apparatus capable of overcoming the disadvantages heretofore arising because of the presence of mill scale or other discontinuities on the outer surface of the tubular member being tested.

In order that the invention may be understood in detail, reference is had to the accompanying drawings, which form a part of this specification, and wherein:

Fig. 1 is a schematic diagram illustrating the manner in which the tubular member being tested is electrically energized to provide the desired magnetic field;

Fig. 2 is a graph showing the distribution of magnetizing force resulting when an electrical current is passed only through the wall of the tubular member being tested;

Fig. 3 is a graph, similar to that of Fig. 2, showing the distribution of magnetizing force resulting when an electrical current is passed only through a conductor disposed longitudinally within the tubular member being tested;

Fig. 4 is a graph, similar to that of Fig. 2, showing the distribution of magnetizing forces when the tubular member being tested is electrically energized in the manner illustrated in Fig. 1;

Fig. 5 is a graph showing the distribution of flux density resulting when the tubular member being tested is electrically energized in the manner illustrated in Fig. 1;

Fig. 7 is a transverse sectional view taken on line 7—7, Fig. 6;

Fig. 8 is a transverse sectional view taken on line 8—8, Fig. 6;

Fig. 9 is a transverse sectional view taken on line 9—9, Fig. 6;

Fig. 10 is a simplified wiring diagram of one form of detecting, measuring and indicating apparatus employed in accordance with the invention;

Fig. 11 is a cross-sectional view of a pipe having a typical defect which can be measured and detected in accordance with the invention, and Fig. 12 is a view illustrating the manner in which the presence, radial position and size of the defect in the pipe of Fig. 11 is indicated by the method and apparatus of the invention.

Figure 6:
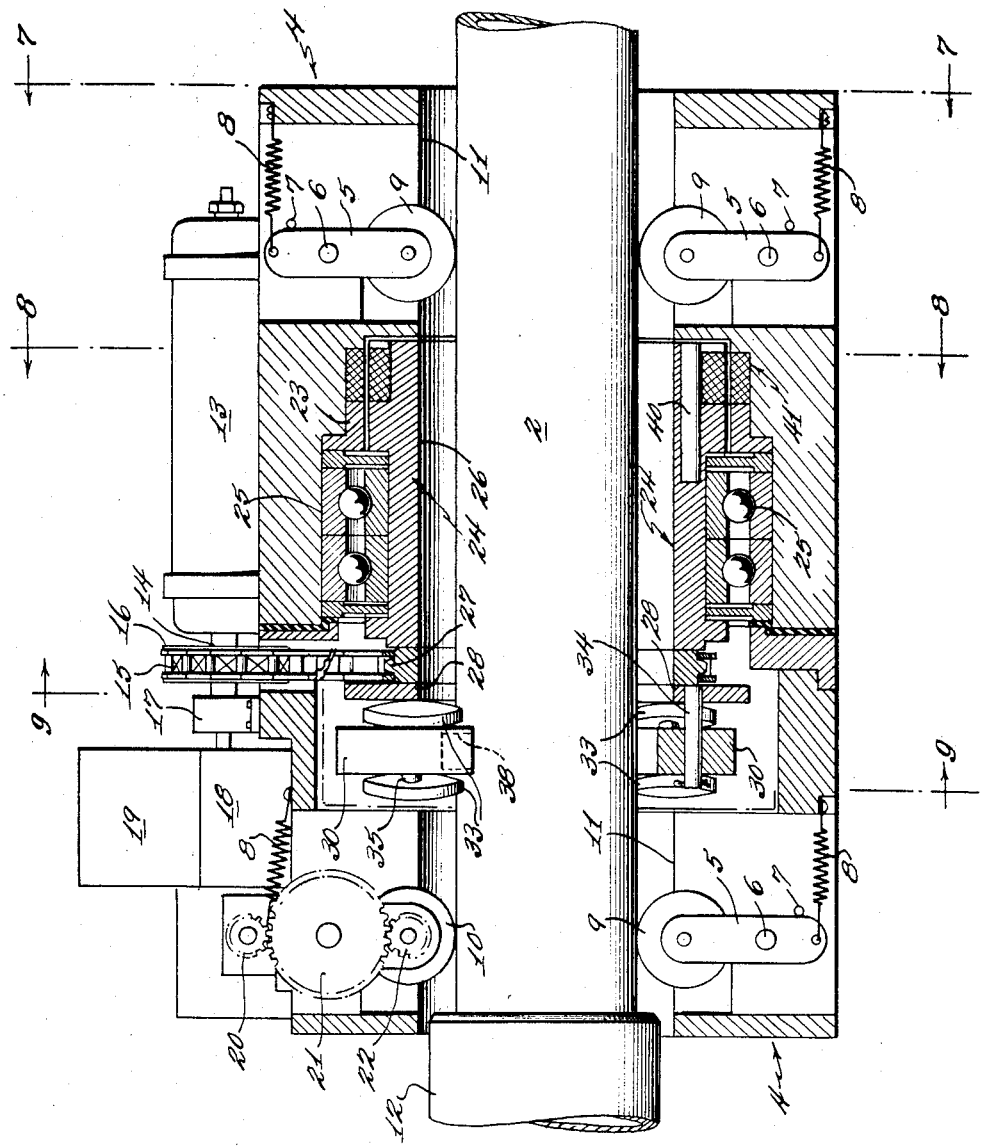
Fig. 6 is a longitudinal sectional view, with some parts shown in elevation, of one embodiment of scanning apparatus employed in accordance with the invention.

In general, the objects of the invention are accomplished by establishing a magnetic field extending circumferentially with respect to the ferromagnetic tubular member to be tested, the flux density of such field being small, advantageously zero, at the outer surface of the tubular member and progressively increasing toward the inner surface of the tubular member, advantageously as the square of the distance from the outer surface thereof, and then scanning the tubular member by means of a pickup coil or other magneto-responsive detecting means disposed at the outer surface of the tubular member. By maintaining a zero flux density, or a negligible flux density, at the outer surface of the tubular member, the effect of outer surface discontinuities is eliminated or reduced to a satisfactory minimum, so that the noise signal problem heretofore inherent in magnetic inspection methods of this type is alleviated.

In magnetic inspection methods of this type, the signal developed as an indication of a flaw is substantially an inverse square function of the distance between the detecting means, such as the pickup coil, and the flaw. By establishing a magnetic field the flux density of which is the square of the distance from the outer surface of the tubular member being inspected, we are able to obtain a signal, and therefore an indication on an indicating device, which is truly representative of the dimension of the flaw, whether the flaw be at the outer surface of the tubular member or the inner surface thereof.

In accordance with the present method, the desired circumferential magnetic field is established by disposing a conductive member 1, Fig. 1, longitudinally within the tubular member 2 to be tested, passing an electrical current through member 1 in one direction and simultaneously passing an electrical current in the opposite direction longitudinally through the wall of the tubular member 2.

As seen in Fig. 2, the effect of the current passed through the wall of tubular member 2 is maximum at the outer surface of the tubular member and zero, or substantially zero, at the inner surface of the tubular member. On the other hand, the magnetizing effect of the current passed through the rod 1 is large at the inner surface of member 2 and small at the outer surface thereof. Referring now to Fig. 4, it will be seen that the combined effects of the two currents provide a maximum magnetizing force at the inner surface of the tubular member, and a minimum magnetizing force at the outer surface thereof. By making the two currents equal, the magnetizing force at the outer surface of the tubular member is made zero. On the other hand, where some magnetizing force is required at the outer surface, the current flowing through the wall of the tubular member 2 can be made smaller than that flowing through conductor 1, the slope of the curve then being between those shown in Figs. 3 and 4, depending upon the difference between the two currents.

With the magnetizing force maximum at the inner surface of the tubular member, minimum or zero at the outer surface of the tubular member, and linear therebetween, as shown in Fig. 4, the flux density of the magnetic field is distributed as illustrated in Fig. 5. Thus, the flux density will be maximum at the inner surface of the tubular member, minimum or zero at the outer surface thereof, and will vary substantially as the square of the distance from the outer surface.

Having established the desired magnetic field circumferentially with respect to the tubular member 2, the next step of the method is to scan the tubular member in such manner as to detect distortions of the magnetic field resulting from flaws or defects, an electrical quantity then being derived corresponding to each such distortion, and the signal then converted to a suitable indication.

In Fig. 1, the conductor 1 and tubular member 2 have been illustrated as connected to a direct current source 3, so that direct current flows simultaneously through the conductor and tubular member but in opposite directions. However, it will be understood that a suitable source of alternating current can be employed, each half cycle of alternating current traversing the conductor 1 and tubular member in opposite directions.

While the tubular member 2 can be scanned with any suitable conventional magneto-responsive detecting device, the apparatus illustrated in Figs. 6–10 is advantageously employed. Designed to traverse the outer surface of the tubular member in helical fashion, the device comprises a carriage 4 adapted to embrace the tubular member 2 to be tested and being provided at each end with a plurality of radially extending arms 5 mounted on pivot pins 6 for movement in planes radial with respect to the tubular member 2. Arms 5 are prevented from pivoting in one direction by stops 7 and are urged into contact with such stops by springs 8. At one end of carriage 4, the arms 5 are all provided with idler wheels 9 which engage the outer surface of member 2 in free-rolling relationship. At the other end of carriage 4, one of the arms 5 is provided with a driving wheel 10, the remainder of the arms at this end being provided with idler wheels.

Arms 5, springs 8 and stops 7 cooperate to maintain the wheels 9 and 10 in engagement with member 2, the arrangement being such that the carriage is positioned with its inner wall 11 concentric with tubular member 2. The carriage is driven by wheel 10 in such fashion that the arms 5 are allowed to pivot in a direction away from the direction of travel, that is, rearwardly, so that the wheels can thus negotiate a coupling 12 or other irregularity in the tubular member 2 being traversed by the device.

Carriage 4 is powered by a suitable electric motor 13 having a driving shaft 14. Adjacent the motor, shaft 14 carries a sprocket 15 engaged with a timing chain 16 for the purpose hereinafter explained. Beyond sprocket 15, shaft 14 is supported in a suitable bearing 17 and, beyond the bearing, is connected to drive a gear box 18 and a resolver 19. The output of gear box 18 is connected to drive gears 20, 21 and 22 and so rotate the driving gear 10 to travel the carriage along tubular member 2.

Centrally of its main body, the carriage 4 is provided with an annular recess 23 in which is mounted a rotor 24. The rotor 24 is mounted for rotation, both with respect to the carriage 4 and the tubular member 2 being inspected, by ball bearings 25. Rotor 24 has a cylindrical inner surface 26 spaced from the tubular member 2 and disposed concentrically with respect thereto. At its forward end, the rotor carries a sprocket wheel 27 engaged with timing chain 16, so that the rotor turns about the axis of tubular member 2 whenever motor 13 is operating.

Also at its forward end, rotor 24 carries a fixed flange plate 28 disposed in a transverse plane lying at right angles to the axis of tubular member 2. Pivoted to the forward face of flange plate 28, at diametrically opposed points 29, are two arms 30, both arms 30 being arranged for movement in a transverse plane parallel to flange plate 28, as will be clear from Figs. 6 and 9. At their outer ends, the arms 30 are provided with weights 31 so that, as rotor 24 rotates, centrifugal force causes the arms 30 to pivot in a direction such that the inner ends of the arms approach the tubular member 2. Arms 30 are biased against such movement by springs 32, the strength of the springs being made such as to allow the biasing force of the springs to be overcome by the centrifugal force resulting, as rotor 24 turns, from the combined weight of the outer arm portions and the counter-weights 31. At both sides of the inner end of each arm 30, wheels 33 are mounted for free rolling contact with the outer surface of tubular member 2, as will be clear from Figs. 6 and 9.

While arms 30, being pivoted on pins 34 fixed in flange plate 28, are mounted for movement in a plane at right angles to the axis of tubular member 2, the axles 35 for wheels 33 are set slightly askew, so that the wheels are disposed at a slight angle, say 6°, to the face of plate 28. Thus, as rotor 24 turns, the wheels 33 traverse a helical path along the surface of the tubular member 2. As will be seen, this helical path is the path along which the apparatus scans the tubular member being inspected. Further, the slight angle at which wheels 33 are set assures that the wheels will climb any irregularities in the tubular member 2 as, for example, the shoulder presented by coupling 12.

From Fig. 9, it will be observed that the inner end portions 36 are maintained out of contact with tubular member 2 by reason of the disposition of wheels 33. However, inner end portions 36 of the arms 30 have faces 37 disposed very close to the outer surface of the tubular member when wheels 33 are in contact with the tubular member. Opening toward each such face 37 in arms 30 are cavities 38 in which are mounted the pickup or detector coils 39, Fig. 10, of the electrical detecting and indicating system of the apparatus. Thus, when arms 30 are in the position illustrated in Fig. 9, the coils 39, forming the magneto-responsive means of the invention, are disposed closely adjacent to the outer surface of the tubular member 2 being inspected.

In operation of the mechanical portion of the apparatus illustrated in Figs. 6–9, the carriage 4 is advanced axially along tubular member 2 by the action of driving wheel 10. In this connection, it will be understood that driving wheel 10 engages the outer surface of tubular member 2 in such fashion as to provide the desired driving force, and that the periphery of wheel 10 may be serrated or provided with any suitable friction facing. As the carriage 4 advances, rotor 24 is rotated continuously, by action of the timing chain 16, so that arms 30 are similarly rotated and, by centrifugal force, urged against the biasing action of springs 32 to the positions indicated in Fig. 9, with detector coils 39 disposed closely adjacent to the outer surface of the tubular member 2. Since rotor 24 is turning as the carriage advances, coils 39 follow a helical path about the tubular member.

The coils 39 constitute magneto-responsive means for developing a signal when one of the coils scans a portion of tubular member 2 containing a flaw and, as will now be explained with reference to Figs. 10–12, the present invention converts such signal to a visible indication of the radial position and dimension of the flaw. As seen in Fig. 10, the coils 39 are connected to a conventional signal amplifier 40 which amplifies the signal voltage from the coils and applies the amplified voltage across the primary winding of a transformer 41. Since a small amount of noise is generated in the transformer, it is advantageous to employ the signal amplifier 40 in order to preserve the signal-to-noise ratio existing at the detector coils, it being understood that this ratio is a highly desirable one attained because of the special method of magnetization hereinbefore described. Advantageously, both the signal amplifier 40 and the transformer 41 are mounted within carriage 4, the amplifier and the primary of the transformer being carried by rotor 24 and the secondary winding of the transformer being carried by the stationary body of the carriage, as shown in Fig. 6. The secondary winding of transformer 41 is connected, through additional signal amplifiers 42 and 43, to the radial deflection electrode 44 of a cathode ray tube 45.

The resolver 19 advantageously comprises two stationary coils 46 and 47 disposed at right angles to each other, and a rotatable coil 48 disposed equidistant from the two stationary coils. The rotatable coil 48 is driven, from motor 13 via gear box 18, in such fashion that the rotatable coil makes one turn for each turn of rotor 24 about the tubular member 2 being inspected. Accordingly, during operation of the device, voltages are induced in stationary coils 46 and 47 which are representative of the rotational position of rotor 24, and thus of the detector coils 39. The stationary coil 46 is connected, via amplifier 49, to the horizontal deflection plates 50 of the cathode ray tube. Similarly, stationary coil 47 is connected, via amplifier 51, to the vertical deflection plates 52 of the cathode ray tube.

In the cathode ray tube 45, an electron beam is generated by cathode 53 and passes to the screen 54 of the tube, causing a spot to be displayed on the screen. The electron beam is continuously deflected, during operation of the device, by the changing charges on deflection plates 50 and 52. Since the charges on the deflection plates 50 and 52 depend upon voltages induced as a result of rotation of coil 48 of resolver 19, the variations on these charges are such that the spot displayed on the cathode ray tube screen 54 moves circumferentially about the screen, such movement being truly representative of the movement of the detector coils 39 about the tubular member 2 being inspected.

When the signal coils 39 scan a portion of member 2 containing a flaw, a corresponding signal voltage is generated in the detector coils and this voltage, after amplification, is applied to the radial deflection electrode 44 of the cathode ray tube. Occurrence of such signal voltage will cause the spot displayed on the cathode ray tube screen to be deflected radially from its circumferential course. Since, at this time, the spot is moving in substantial synchronism with the detector coils, the deflection resulting because of the flaw-promoted signal voltage will occur at a point on the screen 54 which is representative of the radial position of the flaw in the tubular member 2. Since any flaw-promoted signal occurring in the detector coils is approximately an inverse square function of the distance between the detector coils, located substantially at the outer surface of the tubular member 2, and the flaw, and since the special method of magnetization employed in the invention establishes a magnetic field in which the flux density increases as the square of the distance from the outer surface of the tubular member, the magnitude of the deflection of the spot on the cathode ray tube screen resulting because of the flaw-promoted signal will be proportional to the size of the flaw.

In order to brighten the indication on the cathode ray tube screen, an intensifier 55, responding to the signal from the detector coils, is employed.

Also responsive to the signal from detector coils 39 is a galvanometer recorder 56 provided to record the position and size of any flaws encountered. The recorder 56 is advantageously of the strip record type. In order to provide an indication on the recording chart of the radial position of the flaw, a predetermined signal is applied to the recorder to actuate the recording stylus to make a reference mark each time the deflector coils complete one turn about the tubular member 2. The flaw-promoted signals, being applied to the recorder via galvanometer amplifier 57, are recorded in proper space relation to such reference marks, so that both size and position can be read.

In the graphical illustration of operation of the system of Fig. 10 to give a visible indication of the size and radial position of a flaw, seen in Figs. 11 and 12, it is assumed that the tubular member 2 contains a flaw 58, Fig. 11, located at its inner surface. As the detector coils 39 approach the location of flaw 58, the spot displayed on the screen of the cathode ray tube will be following a relatively steady circumferential course, as seen at 59, Fig. 12. As the detector coils scan the area of tubular member 2 containing the flaw, the resulting signal voltage applied to the radial deflection electrode of the cathode ray tube will cause the spot to be deflected from its normal circumferential course, giving the indication seen at 60, Fig. 12. As will be seen by comparing Figs. 11 and 12, the radial position of the flaw 58 is accurately represented by the indication 60. The magnitude of the displacement causing indication 60 is proportional to the size of the flaw, as hereinbefore explained.

If desired, an indication of existence of a flaw can also be obtained by replacing the recorder 56 with a galvanometer, the operator noting the occurrence of a deflection of the galvanometer when a flaw-promoted signal occurs, and simultaneously observing the position of the carriage 4 on the tubular member 2 when such deflection occurs, in order to determine the position of the flaw.

The amplifiers 40, 42, 43, 49 and 51, the intensifier 55, the recorder 56 and the galvanometer amplifier 57 are of conventional construction and have been illustrated only diagrammatically for purposes of simplicity. While one preferred embodiment of the apparatus employed in the present invention has been illustrated, it will be understood that many modifications can be made therein without departing from the scope of the appended claims.

We claim:

1. A method for detecting flaws in a tubular ferromagnetic member comprising the steps of passing an electrical current through a conductor extending longitudinally within the ferromagnetic member, simultaneously passing an electrical current in the opposite direction through the ferromagnetic member, whereby a circumferential magnetic field is established in said member the flux density of which is larger at the inner surface of the member and smaller at the outer surface thereof, such field being distorted by any flaw in the ferromagnetic member, and detecting such distortion as an indication of presence of a flaw.

2. The method of claim 1 wherein said electrical currents are of substantially equal magnitude and the flux density of said magnetic field at said outer surface is substantially zero.

3. A method for detecting flaws in a tubular ferromagnetic member comprising providing a conductive member disposed longitudinally within the ferromagnetic member, passing an electrical current through said conductive member in one direction, simultaneously passing an electrical current in the opposite direction through said ferromagnetic member in the area thereof adjacent said conductive member, whereby a circumferential magnetic field is established in said ferromagnetic member with the flux density of such field being negligible on the outer surface of the ferromagnetic member and increasing toward the inner surface thereof, and detecting distortions of such field as an indication of the presence of flaws in the ferromagnetic member.

4. A method for detecting flaws in a tubular ferromagnetic member comprising the steps of establishing in such member a circumferential magnetic field the flux density of which is negligible at the outer surface of the ferromagnetic member and increases toward the inner surface thereof substantially as the square of the distance from the outer surface, such magnetic field being distorted by any flaws present in the ferromagnetic member, and helically traversing the ferromagnetic member with magneto-responsive detector means disposed at the outer surface of the ferromagnetic member to detect the existence and location of any flaws in the ferromagnetic member.

5. In an apparatus for the non-destruction inspection of tubular ferromagnetic members, the combination of electrical means connectable to such tubular member and including a conductor to be disposed longitudinally therein and means for passing electrical currents in opposite directions simultaneously through said conductor and the tubular member to be inspected, whereby a magnetic field is established circumferentially with respect to the tubular member with the flux density of said field increasing towards the inner surface of the tubular member, scanning means including magneto-responsive detector means and means for positioning the same adjacent the outer surface of the tubular member during movement of the scanning means, and indicating means connected to said magneto-responsive detector means to respond to the signal induced in the detector means as said scanning means traverses a portion of the tubular member containing a flaw.

6. In an apparatus for the non-destructive inspection of ferromagnetic tubular members, the combination of electrical means including a conductor to be disposed longitudinally within the tubular member to be inspected and means for passing substantially equal currents simultaneously through said conductor and the tubular member in opposite directions, whereby a magnetic field is established circumferentially with respect to the tubular member being tested with the flux density of the field being substantially zero at the outer surface of the tubular member and increasing substantially as the square of the distance from said outer surface toward the inner surface of said member, magneto-responsive detector means, means for advancing said detector means along the tubular member being tested with the detector means disposed adjacent the outer surface of the tubular member, and indicating means connected to said detector means to respond to electrical signals induced therein.

7. In an apparatus for the non-destructive inspection of ferromagnetic tubular members, the combination of electrical means including a conductor to be disposed longitudinally within the tubular member to be inspected and means for simultaneously passing electrical currents in opposite directions through said conductor and the tubular member to be inspected, a carriage adapted to traverse the tubular member, a rotor carried by said carriage, a detector coil mounted on said rotor for disposition in close proximity to the outer surface of the tubular member, said electrical means establishing a magnetic field circumferentially with respect to the tubular member being inspected with the flux density of such field increasing toward the inner surface of the tubular member substantially as the square of the distance from the outer surface of such member, such field being distorted by any flaw present in the tubular member and a signal voltage proportional to the size of such flaw being developed in said detector coil as the coil traverses the portion of the tubular member containing the flaw, and indicating means connected to said detector coil to respond to such signal.

8. A method for detecting flaws in a tubular ferromagnetic member comprising the steps of creating in said tubular member a first circumferential magnetic field the flux density of which is larger at the inner surface of the member and smaller at the outer surface thereof, establishing circumferentially of said tubular member a second magnetic field in opposition to said first magnetic field, said second magnetic field being of a magnitude to substantially cancel the flux density of said first magnetic field at the outer surface of said tubular member, and detecting distortions of the resultant magnetic field in said tubular member as an indication of flaws therein.

References Cited in the file of this patent

UNITED STATES PATENTS

| | | |
|---|---|---|
| Re. 19,611 | De Forest | June 18, 1935 |
| 2,519,367 | Gunn et al. | Aug. 22, 1950 |
| 2,563,254 | Lewis | Aug. 7, 1951 |
| 2,629,004 | Greenough | Feb. 17, 1953 |
| 2,684,464 | Hastings et al. | July 20, 1954 |